(12) United States Patent
Heinberg et al.

(10) Patent No.: US 9,141,944 B2
(45) Date of Patent: Sep. 22, 2015

(54) SYNCHRONIZATION OF ALARMS BETWEEN DEVICES

(71) Applicant: Google Inc., Mountain View, CA (US)

(72) Inventors: Jonathan Adam Heinberg, Brooklyn, NY (US); David Philip Feltenberger, New York, NY (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/748,918

(22) Filed: Jan. 24, 2013

(65) Prior Publication Data

US 2014/0204718 A1 Jul. 24, 2014

(51) Int. Cl.
*G04G 7/00* (2006.01)
*G06Q 10/10* (2012.01)
*G04G 13/02* (2006.01)
*G04G 21/04* (2013.01)

(52) U.S. Cl.
CPC ............... *G06Q 10/109* (2013.01); *G04G 7/02* (2013.01); *G04G 13/025* (2013.01); *G04G 13/026* (2013.01); *G04G 21/04* (2013.01)

(58) Field of Classification Search
CPC ....... G04G 7/00; G04G 13/02; G04G 13/021; G04G 7/02; G04G 13/025; G04G 13/026; G04G 21/04; G06Q 10/104; G06Q 10/109; H04M 1/7253; H04M 2250/02
USPC ......... 368/4, 11, 12, 13, 14, 47, 73, 244, 250; 340/426.19, 539.13; 701/412
See application file for complete search history.

(56) References Cited

U.S. PATENT DOCUMENTS

| 5,764,594 A * | 6/1998 | Berman et al. .................. 368/12 |
| 2002/0186618 A1 * | 12/2002 | Kirkpatrick ...................... 368/11 |
| 2004/0003061 A1 | 1/2004 | Litwin, Jr. et al. |
| 2004/0151076 A1 * | 8/2004 | Fidel .............................. 368/251 |
| 2005/0283308 A1 * | 12/2005 | Szabo et al. ................... 701/207 |
| 2006/0153007 A1 * | 7/2006 | Chester ........................... 368/12 |
| 2008/0143578 A1 | 6/2008 | Beyda et al. |
| 2008/0151696 A1 | 6/2008 | Giroud et al. |
| 2008/0259742 A1 * | 10/2008 | Tadanori ........................ 368/263 |
| 2009/0016166 A1 * | 1/2009 | Abuelsaad ........................ 368/9 |
| 2009/0028006 A1 * | 1/2009 | Ha et al. .......................... 368/46 |

(Continued)

FOREIGN PATENT DOCUMENTS

| KR | 20110001408 | 1/2011 |
| WO | 2011112716 | 9/2011 |

OTHER PUBLICATIONS

EESR of EP 14152210.2 dated May 27, 2014.

*Primary Examiner* — Amy Cohen Johnson
*Assistant Examiner* — Matthew Powell
(74) *Attorney, Agent, or Firm* — Morris & Kamlay LLP

(57) ABSTRACT

A method for synchronizing a first device with a second device may include receiving an alarm activation time from the first device. An alarm may be set on the second device to be the same as the alarm activation time. An indication that the alarm is set on the second device may be sent to the first device. Immediately prior to the alarm activation time, it may be determined that the first device is proximate to the second device, and upon determining that the first device is proximate to the second device, the alarm may be activated on the second device at the alarm activation time. The devices may be considered proximate based on a connection protocol, such as when the first device is able to communicate with the second device over a wired or wireless communication protocol.

28 Claims, 6 Drawing Sheets

(a)

(b)

(56) References Cited

U.S. PATENT DOCUMENTS

| | | | |
|---|---|---|---|
| 2009/0049554 A1* | 2/2009 | Vuong et al. | 726/26 |
| 2009/0102669 A1* | 4/2009 | Lin | 340/575 |
| 2009/0129208 A1 | 5/2009 | Weiss | |
| 2009/0147628 A1* | 6/2009 | Oh et al. | 368/73 |
| 2009/0305631 A1* | 12/2009 | Walley | 455/41.2 |
| 2009/0316671 A1 | 12/2009 | Rolf et al. | |
| 2010/0159893 A1* | 6/2010 | Baldwin et al. | 455/413 |
| 2010/0177598 A1 | 7/2010 | Zhang et al. | |
| 2010/0195447 A1* | 8/2010 | George | 368/13 |
| 2010/0265931 A1 | 10/2010 | Loc | |
| 2011/0130958 A1* | 6/2011 | Stahl et al. | 701/201 |
| 2011/0170534 A1 | 7/2011 | York | |
| 2011/0195748 A1* | 8/2011 | Main et al. | 455/557 |
| 2011/0230209 A1* | 9/2011 | Kilian | 455/456.3 |
| 2012/0146918 A1* | 6/2012 | Kreiner et al. | 345/173 |
| 2012/0278727 A1 | 11/2012 | Ananthakrishnan et al. | |
| 2012/0295662 A1* | 11/2012 | Haubrich | 455/556.1 |
| 2012/0309289 A1* | 12/2012 | Walsh et al. | 455/3.06 |

\* cited by examiner

SYNCHRONIZATION OF ALARMS BETWEEN DEVICES

BACKGROUND

Synchronization of clocks and alarms can be difficult. Specifically, when the time displayed on two clocks is different, it can be difficult to synchronize the time, especially down to the second. Additionally, setting and managing alarms can be tedious and redundant when using multiple clocks. For example, a user may set an alarm on her mobile device but may want the alarm to ring on her tabletop clock. In this case, the user would have to also set the alarm on her clock to match the alarm on her mobile device. Additionally, if the user did not wish to have both alarms active, the alarm on the mobile device would have to be deactivated. Furthermore, it can be difficult to synchronize notifications when using multiple devices. For example, a user may wish to receive a calendar notification only on one device, but when using multiple devices, the user may receive redundant and repetitive calendar notifications on her mobile device, personal laptop, and work computer.

BRIEF SUMMARY

According to an implementation of the disclosed subject matter, a method for synchronizing a first device with a second device may include receiving an alarm activation time from the first device. An alarm may be set on the second device to be the same as the alarm activation time. Next, an indication that the alarm is set on the second device may be sent to the first device. Immediately prior to the alarm activation time, it may be determined that the first device is proximate to the second device. Upon determining that the first device is proximate to the second device, the alarm may be activated on the second device at the alarm activation time.

According to an implementation of the disclosed subject matter, a method for synchronizing a first device with a second device may include receiving an alarm activation time on the first device. An alarm may be set on the first device to match the alarm activation time. Next, the alarm activation time may be provided to the second device. An indication that the alarm is set on the second device may be received from the second device. Immediately prior to the alarm activation time, it may be determined that the first device is proximate to the second device. Upon determining that the first device is proximate to the second device, the alarm may be deactivated on the first device.

According to an implementation of the disclosed subject matter, a system may include a processor configured to receive an alarm activation time from a first device. An alarm may be set to be the same as the alarm activation time. An indication that the alarm is set on the second device may be sent to the first device. Immediately prior to the alarm activation time, it may be determined that the first device is proximate to the second device. Upon determination that the first device is proximate to the second device, the alarm may be activated on the second device at the alarm activation time.

According to an implementation of the disclosed subject matter, a system may include a computer-readable medium storing an alarm activation time. The system may also include a processor configured to set an alarm to match the alarm activation time on a first device. Next, the alarm activation time may be provided to a second device. Next, an indication that the alarm is set on the second device may be received from the second device. Immediately prior to the alarm activation time, it may be determined that the first device is proximate to the second device. Upon determination that the first device is proximate to the second device, the alarm may be deactivated.

Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

It may be advantageous to have a clock that synchronizes with a mobile device when the clock and mobile device are within a certain proximity to each other, thereby preventing the user from having to set and/or deactivate an alarm time on multiple clocks/devices. For example, when the mobile device is within range of a clock, the clock may automatically synchronize the displayed time with the time displayed on the mobile device, or vice versa. Further, when the mobile device is within range of a clock, the clock may automatically synchronize with the mobile device by setting an alarm on the clock to match the alarm on the mobile device. Then, the mobile device may receive an indication that the clock has synchronized with the set alarm time and, accordingly, the alarm on the mobile device may be disabled or both the clock and mobile device alarms could sound simultaneously, depending on user preference. The mobile device may be considered "within range" of the clock based on a connection protocol, such as where the device is able to communicate with the clock over a wired or wireless communication protocol.

Figure 5:
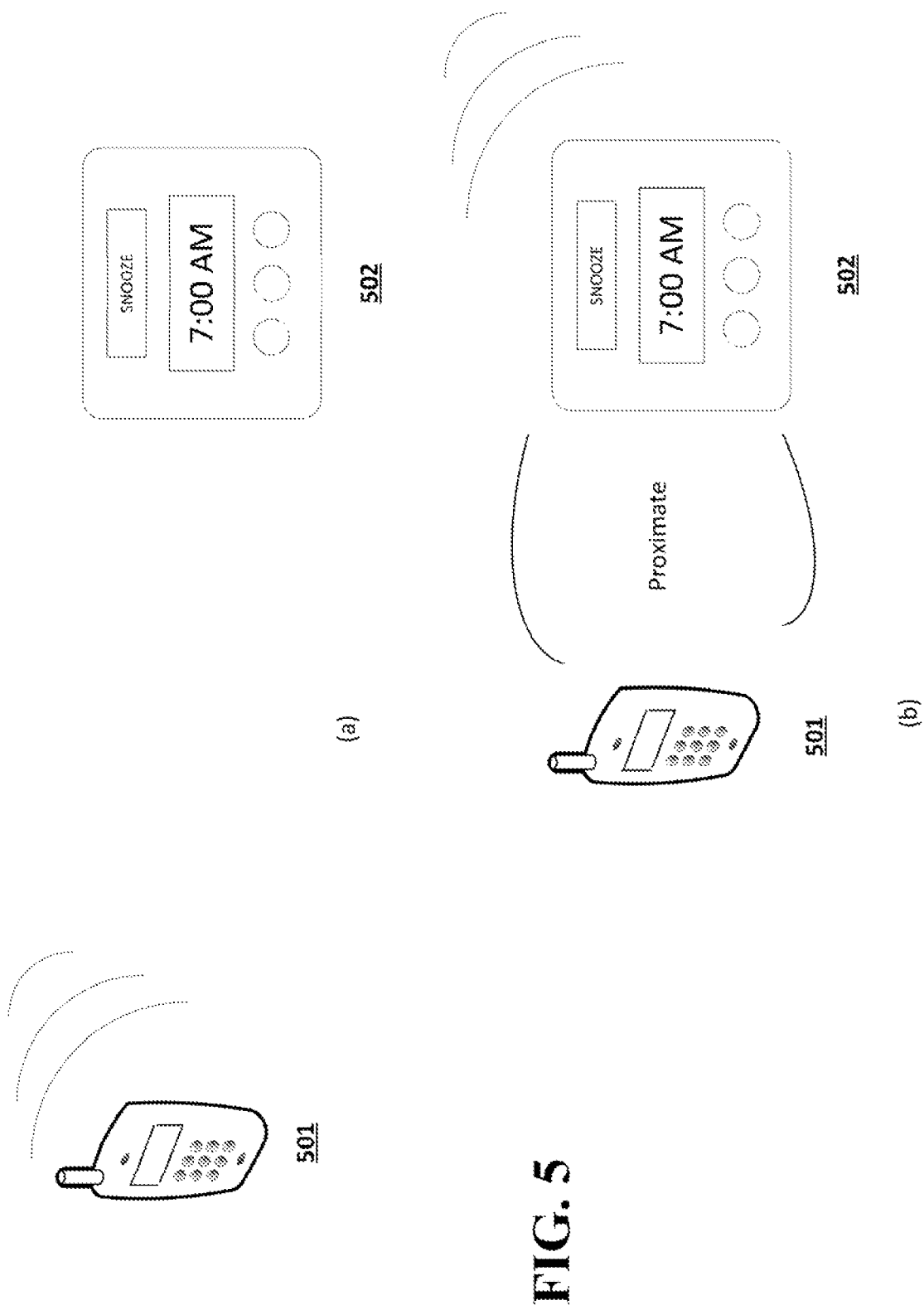
FIG. 5 shows example configurations according to an implementation of the disclosed subject matter.

FIG. 5 shows a basic arrangement of example devices according to the presently disclosed subject matter. As shown, a user may wish to only set an alarm on their mobile device 501 but have the alarm ring on the mobile device 501 and/or a particular clock 502 depending on the location of the user's mobile device 501. Based on user preference, the alarms on the clock and mobile device may ring simultaneously, or the alarm may only ring on the clock 502 as shown in FIG. 5(b) or the mobile device 501 as shown in FIG. 5(a). For example, if the user is at home at the alarm time, the user may wish for the alarm to ring on their bedside alarm clock 502 rather than on their mobile device 501. However, if the user is not at home, the user may wish for the alarm to ring only on their mobile device 501.

For example, a user may set an alarm on their mobile device 501 to go off at 7:00 a.m. As shown in FIG. 5(b), when the mobile device 501 is located within proximity, such as within a field of communication, of the clock 502, the clock 502 may automatically set an alarm time that matches the alarm set on the mobile device 501. Next, the mobile device may receive an indication that the clock has set the alarm time, and accordingly, the alarm on the mobile device 501 may be deactivated. In this case, if the mobile device 501 is within proximity of the clock 502 immediately prior to 7:00 a.m., only the alarm on the clock 502 will sound at 7:00 a.m. as shown in FIG. 5(b). Alternatively, based on user preference, the alarm on the clock may sound at 7:00 a.m. simultaneously with the alarm on the mobile device. If, however, the mobile device 501 is not within proximity of the clock 502 immediately prior to 7:00 a.m., for example if the user is at a friend's house, the alarm will only ring on the mobile device 501, as shown in FIG. 5(a).

Figure 1:
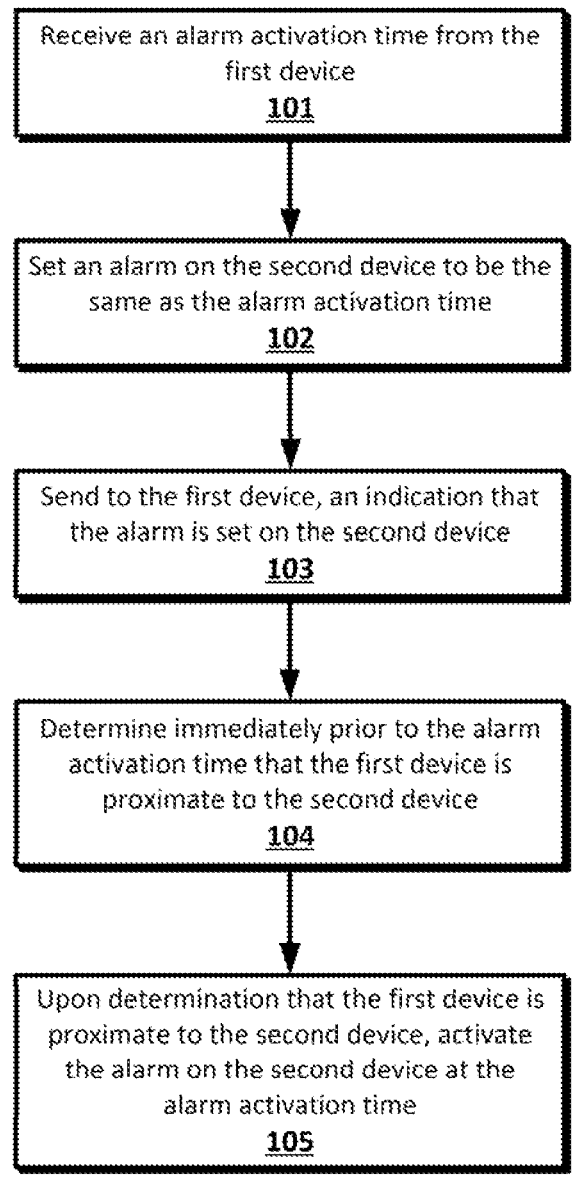
FIG. 1 shows an example process according to an implementation of the disclosed subject matter.

More generally, an implementation of the disclosed subject matter provides a method for synchronizing a first device with a second device, as shown in FIG. 1. The method may include receiving an alarm activation time from the first device at 101 and setting an alarm on the second device to be the same as the alarm activation time at 102. Next, an indication that the alarm is set on the second device may be sent to the first device at 103. Immediately prior to the alarm activation time, it may be determined that the first device is proximate to the second device at 104, and upon determining that the first device is proximate to the second device, the alarm may be activated on the second device at the alarm activation time at 105.

Figure 2:
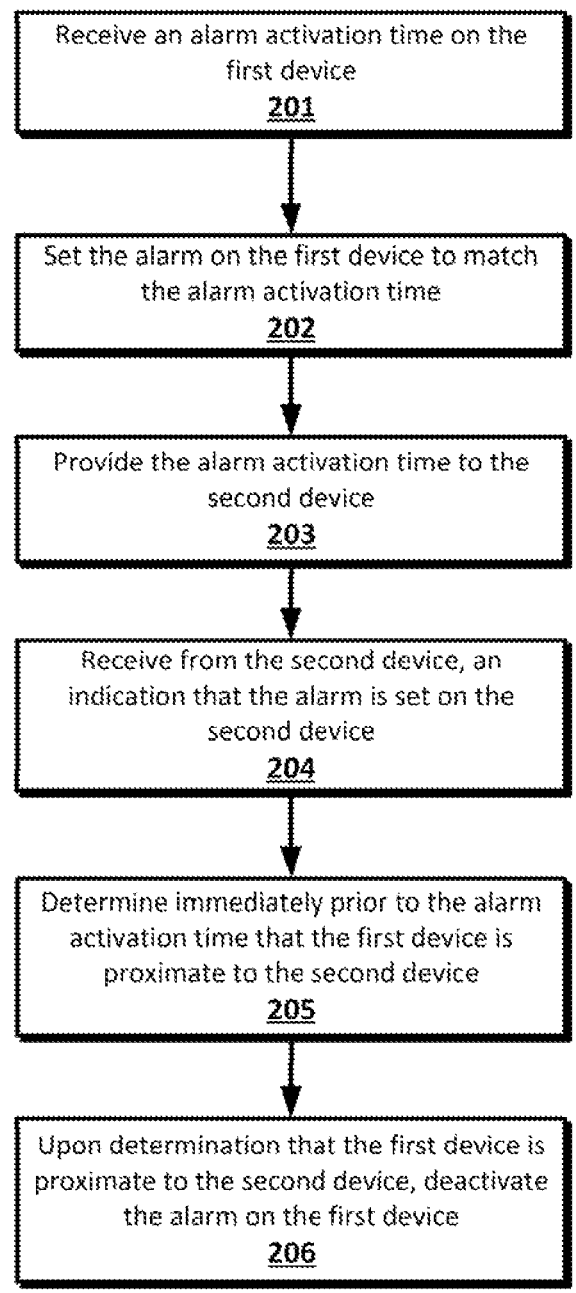
FIG. 2 shows an example process according to an implementation of the disclosed subject matter.

Additionally, an implementation of the disclosed subject matter provides a method for synchronizing a first device with a second device, as shown in FIG. 2. The method may include receiving an alarm activation time on the first device at 201 and setting the alarm on the first device to match the alarm activation time at 202. Next, the alarm activation time may be provided to the second device at 203. An indication that the alarm is set on the second device may be received from the second device at 204. Immediately prior to the alarm activation time, it may be determined that the first device is proximate to the second device at 205. For example, one or both devices may determine that the devices are proximate based upon the ability of the devices to communicate over a specific network or protocol, based upon geolocation information available to one or both devices, or using other positional techniques as disclosed herein. Upon determining that the first device is proximate to the second device, the alarm may be deactivated on the first device.

Figure 3:
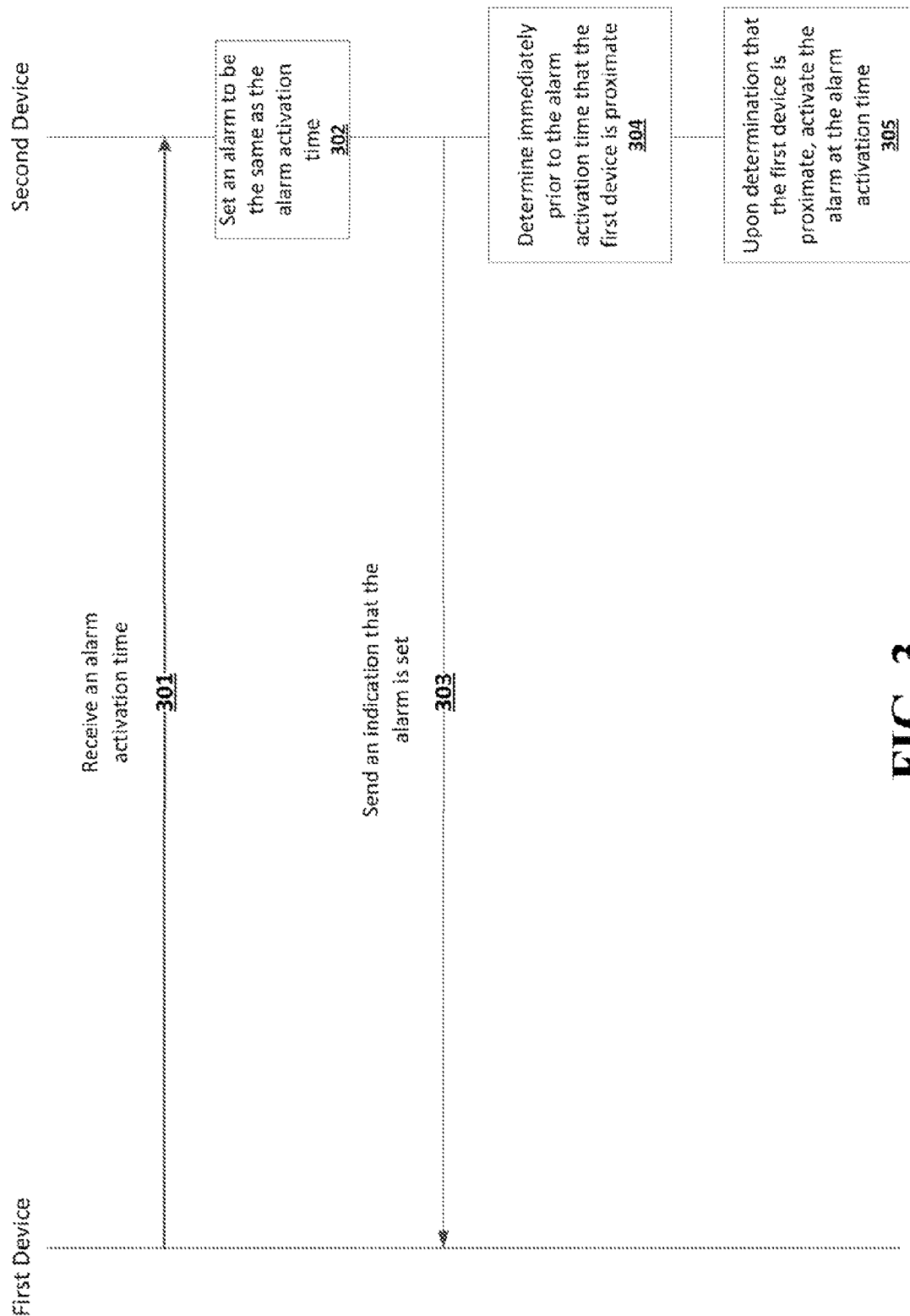
FIG. 3 shows an example information flow according to an implementation of the disclosed subject matter.

FIG. 3 shows an example data exchange according to an implementation of the disclosed subject matter. A data exchange may include a second device that may receive an alarm activation time from a first device at 301. The second device may set an alarm on to be the same as the alarm activation time at 302. Next, the second device may send to the first device, an indication that the alarm is set on the second device at 303. Immediately prior to the alarm activation time, it may be determined that the first device is proximate to the second device at 304 as previously described. As a result, the alarm may be activated on the second device at the alarm activation time, at 305.

Figure 4:
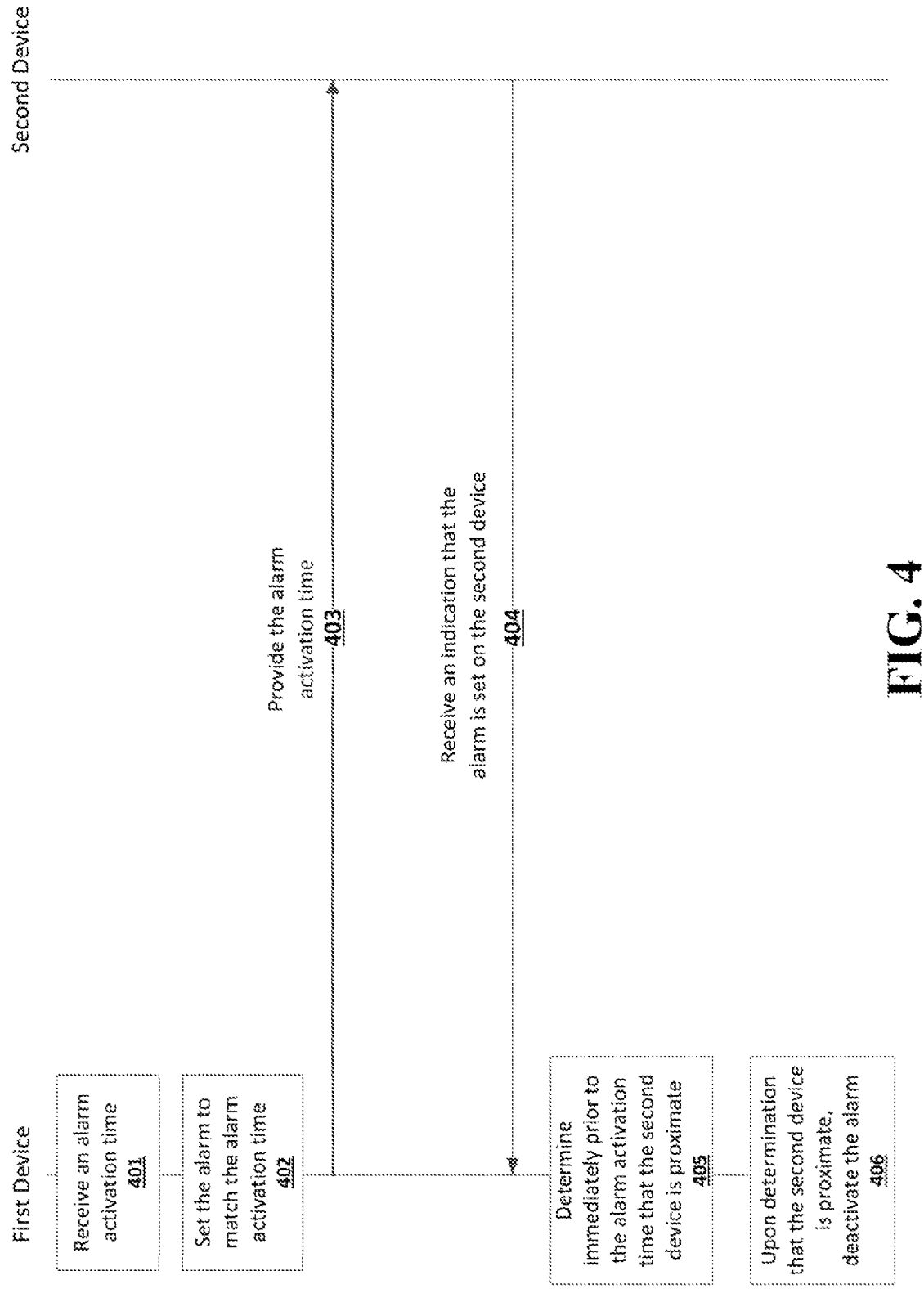
FIG. 4 shows an example information flow according to an implementation of the disclosed subject matter.

FIG. 4 shows an example data exchange according to an implementation of the disclosed subject matter. A data exchange may include a first device that may receive an alarm activation time at 401 and set an alarm to match the alarm activation time at 402. The first device may provide the alarm activation time to a second device, at 403. Next, the first device may receive from the second device, an indication that the alarm is set on the second device at 404. Immediately prior to the alarm activation time, it may be determined that the first device is proximate to the second device as previously described, such as at 405. Upon determination that the first device is proximate to the second device, the alarm may be deactivated on the first device, at 406.

An alarm may include receipt of a notification or other communication about which the user would customarily receive a notification. Implementations disclosed herein may allow the user to specify which of several devices may provide such a notification, using the same techniques described with respect to a typical alarm. For example, a user may wish to receive a social media notification on only one device, but have the notification appear on their mobile device or their tablet depending on the location of the user's mobile device. If the user is near their tablet when a notification is received, the user may wish for the notification to appear on their tablet rather than on their mobile device. Similarly, if the user is not near their tablet, the user may wish for the notification to appear only on their mobile device. When the mobile device is located within proximity of the tablet, the mobile device may receive an indication that the tablet is nearby and, accordingly, social media notifications may be deactivated on the mobile device. If the mobile device is within proximity of the tablet immediately prior to receiving a social media notification, the social media notification may only appear on the tablet. If, however, the mobile device is not within proximity of the tablet immediately prior to receiving a social media notification, the notification may only appear on their mobile device.

According to an implementation, the determination that the first device is proximate to the second device may be based on a connection between the first device and the second device. For example, the connection may be a connection-type including various wired and wireless communication protocols such as a physical wire, USB, Wi-Fi, Bluetooth, Internet, near field communications, location service, or other wired and wireless connection protocols. A location service may include a third-party service that coordinates when two or more devices are proximate to each other such as GPS location, social media location check-ins, and similar location based techniques for determining when two or more devices are located near each other.

Furthermore, the first device and second device may communicate by direct communication or indirect communication. In an implementation, the communication between two or more devices may be across one or more bridges between the interfaces. For example, the communications between the first device and the second device may be managed or assisted by a third device, such as a coordinating device, local coordinator, remote server, third party service provider, satellite, network, remote entity, and the like.

A device may be a smartphone, PDA, handheld device, handheld computer, wearable computer, tablet, laptop, PC, clock, appliance, or a mobile phone. A wearable computer may include a wristwatch, augmented-reality glasses or eyepieces, healthcare monitoring system, identity tag, and other similar devices capable of activating an alarm. In an implementation, the first device may be a smartphone and the second device may be a clock. Furthermore, implementations of the disclosed subject matter may include multiple devices.

An alarm activation time may be based on an alarm-type including an alarm clock, a calendar, a reminder notification, an application notification, a timer, user input, a program, a subscription service, an application, and any other entity that is capable of providing an alarm or alarm activation time. For example, an application notification may include notifications relating to sports scores, traffic, flight status, news, stock prices, events, promotional offers, social media, text messages, emails, chats, video chats, and the like. Additionally, an alarm may be an audio indicator, a displayed message, a text message, an email, a portable application notification, a proprietary application alert, a recorded message, a visual indicator, or any similar or otherwise suitable alarm that can be activated on a device.

Additionally, an implementation of the disclosed subject matter provides a method for synchronizing the time displayed on a first device and a second device upon determining that the devices are proximate to each other.

Figure 6:
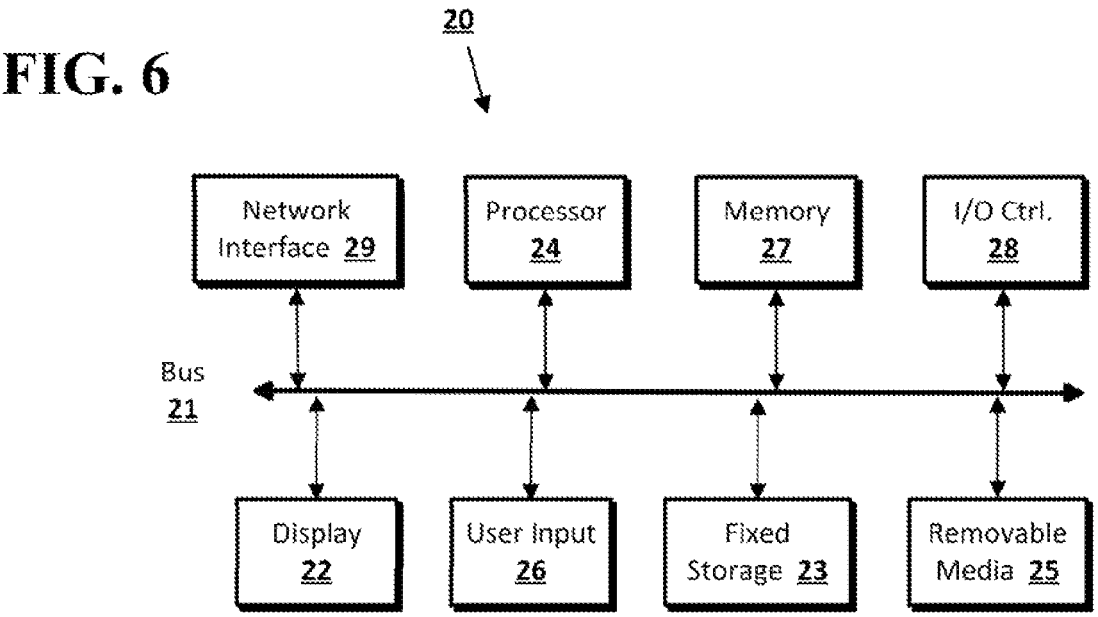
FIG. 6 shows a computer according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
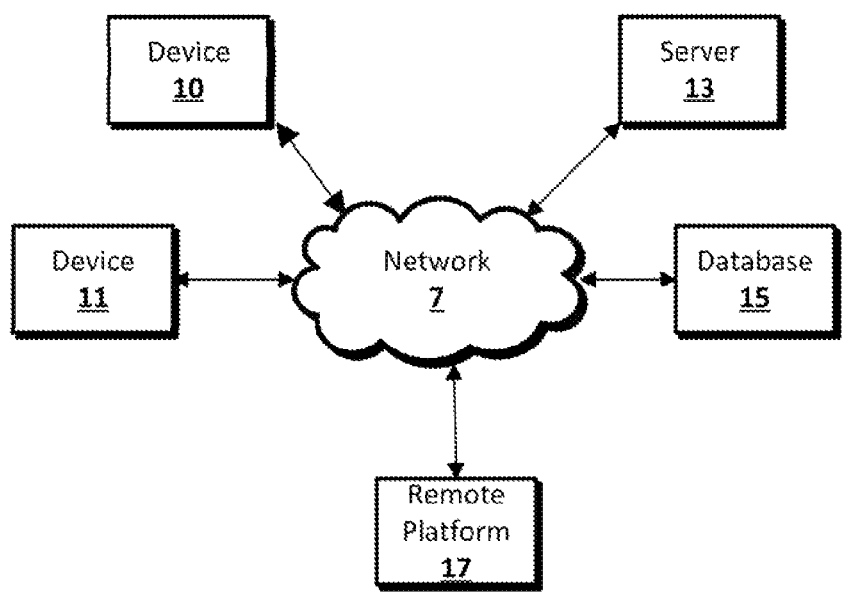
FIG. 7 shows a network configuration according to an implementation of the disclosed subject matter.

FIG. 7 shows an example network arrangement according to an embodiment of the disclosed subject matter. One or more devices 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The devices may communicate with one or more servers 13 and/or databases 15. The devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit implementations of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those implementations as well as various implementations with various modifications as may be suited to the particular use contemplated.

The invention claimed is:

1. A method for synchronizing a first device with a second device, comprising:
    receiving, from the first device when the first device is proximate to the second device, an alarm activation time set on the first device,
    setting an alarm on the second device to be the same as the alarm activation time,
    sending to the first device, an indication that the alarm is set on the second device,
    determining immediately prior to the alarm activation time that the first device is proximate to the second device,
    upon determining that the first device is proximate to the second device, activating the alarm on the second device at the alarm activation time and deactivating the alarm on the first device.

2. The method of claim 1, wherein the determination that the first device is proximate to the second device is based on a connection between the first device and the second device.

3. The method of claim 1, wherein the connection is a connection-type selected from the group consisting of a wire, near field communications, Bluetooth, location service, or other wireless connection protocol.

4. The method of claim 1, wherein each of the first device and second device is independently selected from the group consisting of a smartphone, PDA, handheld device, handheld computer, wearable computer, tablet, laptop, PC, clock, appliance, and a mobile phone.

5. The method of claim 4, wherein the first device is a smartphone.

6. The method of claim 4, wherein the second device is a clock.

7. The method of claim 1, wherein the alarm activation time is based on an alarm-type selected from the group consisting of an alarm clock, calendar event, reminder notification, application notification, program notification, and a timer.

8. A method for synchronizing a first device with a second device, comprising:
    receiving an alarm activation time on the first device,
    setting the alarm on the first device to match the alarm activation time,
    providing the alarm activation time to the second device when the first device is proximate to the second device,
    receiving from the second device, an indication that the alarm is set on the second device,
    determining immediately prior to the alarm activation time that the first device is proximate to the second device,
    upon determining that the first device is proximate to the second device, deactivating the alarm on the first device.

9. The method of claim 8, wherein the determination that the first device is proximate to the second device is based on a connection between the first device and the second device.

10. The method of claim 9, wherein the connection is a connection-type selected from the group consisting of a wire, near field communications, Bluetooth, location service, or other wireless connection protocol.

11. The method of claim 8, wherein each of the first device and the second device is independently selected from the group consisting of a smartphone, PDA, handheld device, handheld computer, wearable computer, tablet, laptop, PC, clock, appliance, and a mobile phone.

12. The method of claim 11, wherein the first device is a smartphone.

13. The method of claim 11, wherein the second device is a clock.

14. The method of claim 8, wherein the alarm activation time is based on an alarm-type selected from the group consisting of an alarm clock, calendar event, reminder notification, application notification, program notification, and a timer.

15. A system, comprising:
    a processor configured to:
    receive, from a first device when the first device is proximate to a second device, an alarm activation time set on the first device,
    set an alarm on a second device to be the same as the alarm activation time,
    send to the first device, an indication that the alarm is set on the second device,
    determine immediately prior to the alarm activation time that the first device is proximate to the second device, and
    activate the alarm on the second device at the alarm activation time and deactivate the alarm on the first device upon determination that the first device is proximate to the second device.

16. The system of claim 15, wherein the determination that the first device is proximate to the second device is based on a connection between the first device and the second device.

17. The system of claim 16, wherein the connection is a connection-type selected from the group consisting of a wire, near field communications, Bluetooth, location service, or other wireless connection protocol.

18. The system of claim 15, wherein each of the first device and second device is independently selected from the group consisting of a smartphone, PDA, handheld device, handheld computer, wearable computer, tablet, laptop, PC, clock, appliance, and a mobile phone.

19. The system of claim 18, wherein the first device is a smartphone.

20. The system of claim 18, wherein the second device is a clock.

21. The system of claim 15, wherein the alarm activation time is based on an alarm-type selected from the group consisting of an alarm clock, calendar event, reminder notification, application notification, program notification, and a timer.

22. A system, comprising:
    a computer-readable medium storing an alarm activation time;
    a processor configured to:
    set an alarm to match the alarm activation time on a first device,
    provide the alarm activation time to a second device when the first device is proximate to the second device,
    receive from the second device, an indication that the alarm is set on the second device,
    determine immediately prior to the alarm activation time that the first device is proximate to the second device, and
    deactivate the alarm upon determination that the first device is proximate to the second device.

23. The system of claim 22, wherein the determination that the first device is proximate to the second device is based on a connection between the first device and the second device.

24. The system of claim 23, wherein the connection is a connection-type selected from the group consisting of a wire, near field communications, Bluetooth, location service, or other wireless connection protocol.

25. The system of claim 22, wherein each of the first device and second device is independently selected from the group consisting of a smartphone, PDA, handheld device, handheld computer, wearable computer, tablet, laptop, PC, clock, appliance, and a mobile phone.

26. The system of claim 25, wherein the first device is a smartphone.

27. The system of claim 25, wherein the second device is a clock.

28. The system of claim 22, wherein the alarm activation time is based on an alarm-type selected from the group consisting of an alarm clock, calendar event, reminder notification, application notification, program notification, and a timer.

* * * * *